April 24, 1928.

R. G. JONES ET AL 1,667,070

ARMATURE WINDING MACHINE

Original Filed Jan. 23, 1925    8 Sheets-Sheet 1

Fig. 1

Inventors
Russell G. Jones and
Carl Zwiebel
By Spencer Small and Hardman
their Attorneys April 24, 1928.

R. G. JONES ET AL 1,667,070

ARMATURE WINDING MACHINE

Original Filed Jan. 23, 1925    8 Sheets-Sheet 4

Inventors
Russell G. Jones
and Carl Zwiebel
By Spencer, Sewall and Hardman
their Attorneys

R. G. JONES ET AL 1,667,070

ARMATURE WINDING MACHINE

Original Filed Jan. 23, 1925   8 Sheets-Sheet 8

Patented Apr. 24, 1928.

1,667,070

UNITED STATES PATENT OFFICE.

RUSSELL G. JONES, OF LONDON, ENGLAND, AND CARL ZWIEBEL, OF DAYTON, OHIO, ASSIGNORS, BY MESNE ASSIGNMENTS, TO DELCO-REMY CORPORATION, OF DAYTON, OHIO, A CORPORATION OF DELAWARE.

ARMATURE-WINDING MACHINE.

Original application filed January 23, 1925, Serial No. 4,342. Divided and this application filed April 11, 1927. Serial No. 183,019.

This invention relates to apparatus for winding the armatures of dynamo electric machines. This type of machine includes a power-driven winding fixture adapted to receive an open-slotted armature core. One or more flexible wires are attached to the winding fixture and these wires are unwound from supply reels by the rotation of the winding fixture which also includes means for guiding the wires into armature core slots having predetermined spacing.

This application is a division of our Patent No. 1,635,677, issued July 12, 1927.

One object of the present invention is to provide improved means for regulating the tension on the wire unwound from the supply reel and also to provide means for relieving the tension on the wire automatically when an armature coil has been completed in order that the manipulation of the wire to form a loop will be facilitated.

A further object is to provide improved means for automatically stopping the rotation of the winding head after an armature coil is completed.

Further objects and advantages of the present invention will be apparent from the following description, reference being had to the accompanying drawings, wherein a preferred form of the present invention is clearly shown.

*Supply reel brake.*

Figure 1:
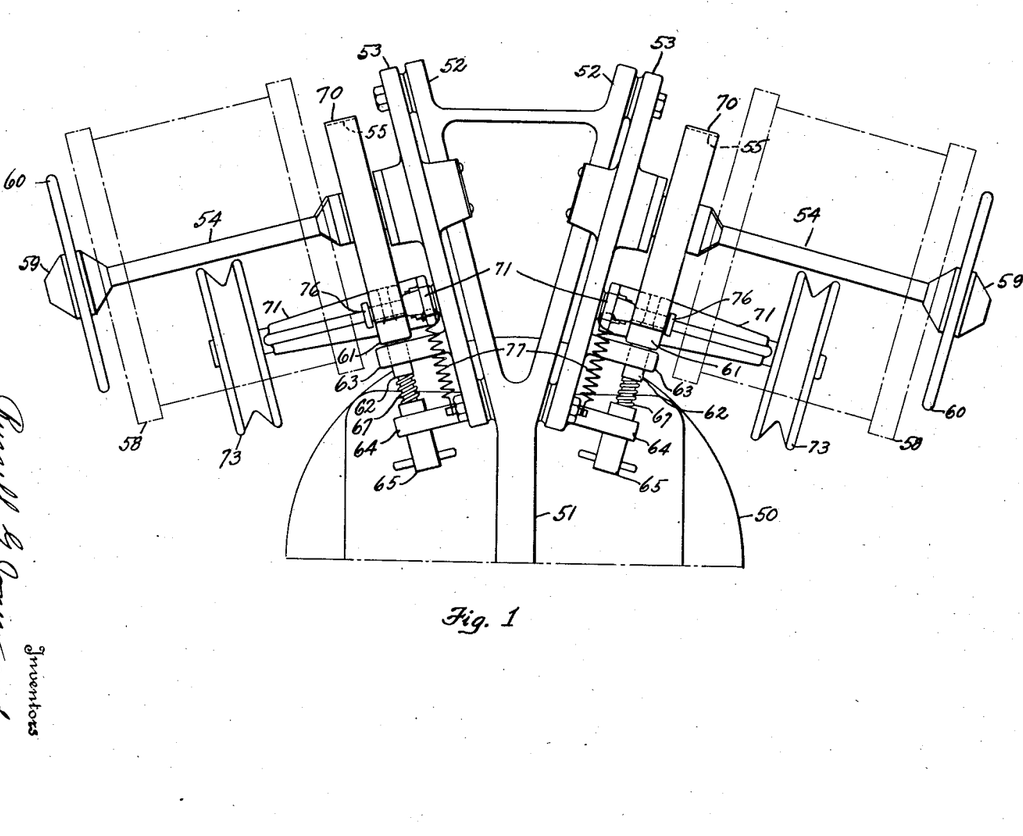
Figs. 1 and 2, together comprise a plan view of a winding machine embodying the present invention.
Figures 5, 6, 7:
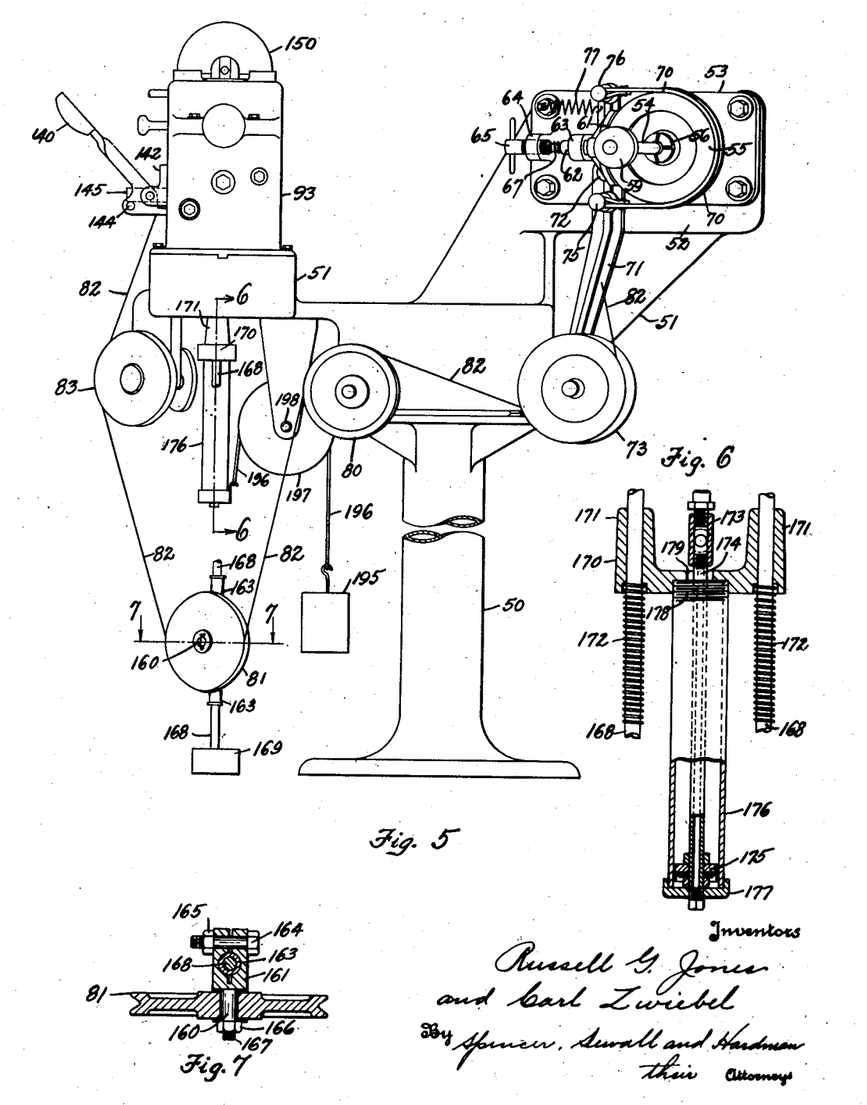
Fig. 5 is an end view of the machine on a smaller scale than the preceding figures.
Fig. 6 is a sectional view on line 6—6 of Fig. 5.
Fig. 7 is a sectional view on line 7—7 of Fig. 5.

The winding machine includes a stand or pedestal 50 which supports a platform 51 providing outwardly-diverging brackets 52 (see Fig. 1), each bracket 52 carrying a reel spindle bracket 53 which supports for rotation a reel spindle 54 carrying a brake drum 55 and a driving collar 56 (see Fig. 7), having sharp ridges 57 which are adapted to bite into the wooden wire supply reel 58 which is clamped against the collar 56 by nut 59 provided with a hand wheel 60 (which is omitted in Fig. 5). The brake drum 55 is engaged by a brake shoe 61 mounted on a rod 62 which slides through a lug 63 extending from the bracket 53. A lug 64 is threadedly engaged by an adjusting screw 65 provided with a central bore 66 for receiving the reduced shank 62ª of the rod 62. A spring 67 is interposed between the rod 62 and the screw 65. By turning the screw 65 the compression of spring 67 will be varied to vary the braking pressure between the shoe 61 and the drum 55. This braking device is used to apply pressure continuously to the brake drum, so that a certain amount of tension is maintained in the wire all of the time.

Figure 8:
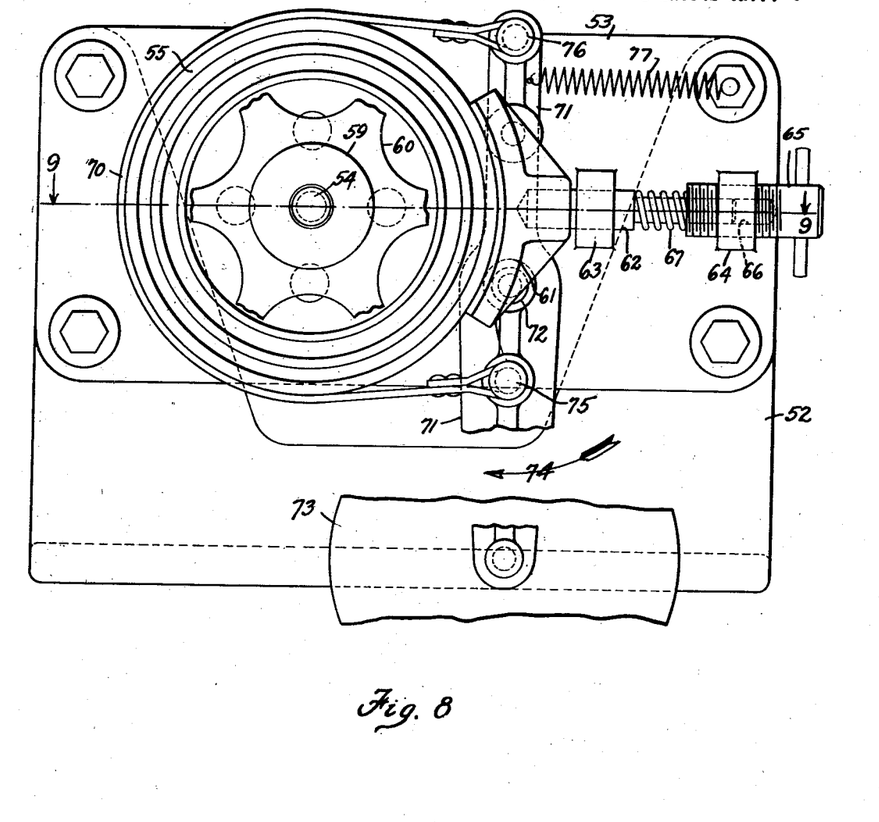
Fig. 8 is a fragmentary side view of a portion of the wire-tensioning apparatus.

The means for applying a variable tension to the wire as the winding speed varies includes a brake band 70 for engaging the drum 55. The ends of the band 70 are connected with a lever 71 which is pivoted at 72 upon the bracket 53. The lower end of the lever 71 supports a guide pulley 73. A sudden increase in the tension of the wire or due to the sudden increase in winding speed causes the lever 71 to be moved counter-clockwise as viewed in Fig. 8, thereby relieving the tension on the wire by reason of reduction of pressure between the brake band 70 and the drum 55. As the pin 75 connecting the lower end of the brake band to the lever 71 moves a shorter distance than the pin 76 connecting the upper end of the brake band 70, it is apparent that the brake band 70 will tend to move away from the drum 55. A spring 77, attached at one end to the bracket 53 and at the other end to lever 71 tends to restore the lever to normal position and thereby restore the normal braking pressure upon the brake drum.

The wire from each supply reel 58 is passed about a set of pulleys including the guide pulley 73 already described, a pulley 80 attached to the platform 50, and a pulley 81 which is mounted for vertical movement for a purpose to be described. In Fig. 5 one of the wires is indicated by the numeral 82. The wires 82 from the two supply reels are roved together over a common guide pulley 83 in a manner to be described. As shown in Fig. 29, the ends of the two wires 82 are attached to a rotatable winding apparatus.

Winding fixture drive.

For the purpose of driving the winding apparatus there is provided a horizontal shaft or winding spindle 90 journaled in bearings 91 and 92 supported by a gear housing 93 which is mounted upon the platform 51. A disc 94 is attached by a pin 95 to the shaft 90. A conical friction clutch member 96 is attached by screws 97 to the disc 94 and is adapted to be received by a companion clutch member 98 which is attached to a gear 99. Gear 99 is attached to a sleeve 100 slidably journaled on the shaft 90. The sleeve 100 includes a reduced portion 101 providing a shoulder 102. A bearing race 103 slides endwise along the reduced portion 101, and cooperates with a bearing race 104 and ball bearings 105. The bearing race 104 is received by a clutch-shifting collar 106, attached to a disc 106ᵃ by screws 106ᵇ, and is provided with diametrically opposite outwardly-extending pins 107. The reduced portion 101 is threaded at 108 to receive nuts 109 and 110, to resist motion to the right, in Fig. 10, of the bearing members 103, 104, and 105. It is evident that movement of the shifting collar 106 to the right will cause the clutch members 96 and 98 to be disengaged. These clutch members are maintained normally in engagement by spring 111 interposed between a collar 112 attached by a pin 113 to shaft 90 and a sleeve 114 having a flange 115 for engaging a bearing race 116 which cooperates with ball bearings 117 and a bearing race 118, which abuts the adjusting nuts 109 and 110.

Automatic stop mechanism.

The mechanism for automatically disengaging the clutch members 98 and 96 after a predetermined number of revolutions of the shaft 90 includes a one-tooth gear 120 attached by pin 121 to the shaft 90 and driving a Geneva gearing 122, which is rotatable upon a stub shaft 122ᵃ carried by the gear housing 93. The gear 122 carries a disc 123 having a notch 124 for receiving the free ends of a lever 125 which is pivoted upon rod 126 supported by housing 93. The lever 125 is normally maintained in engagement with the disc 123 by a spring 127 having its upper end attached to the lever 125 and its lower end attached to a screw 128 which passes freely through a bracket 129 and is threadly engaged by a nut 130 carrying a cross-pin 131 for manipulating the nut. Bracket 129 is supported by the gear housing 93. Housing 93 carries a pin 132 which provides a pivot for a clutch-shifting lever 133 including lever arms 134 for engaging the clutch-shifting collar pins 107. Lever 133 is engaged by a pin 135 carried by lever 125. Obviously, whenever the notch 124 of disc 123 is brought into vertical alignment with the lever 125 the latter will be moved by the spring 127 into the notch 124. This motion will cause the pin 135 to engage the lever 133 and will cause the latter to move the clutch-shifting collar 106 to the right, as viewed in Fig. 10, thereby moving the clutch member 98 out of engagement with the clutch member 96.

Figure 9:
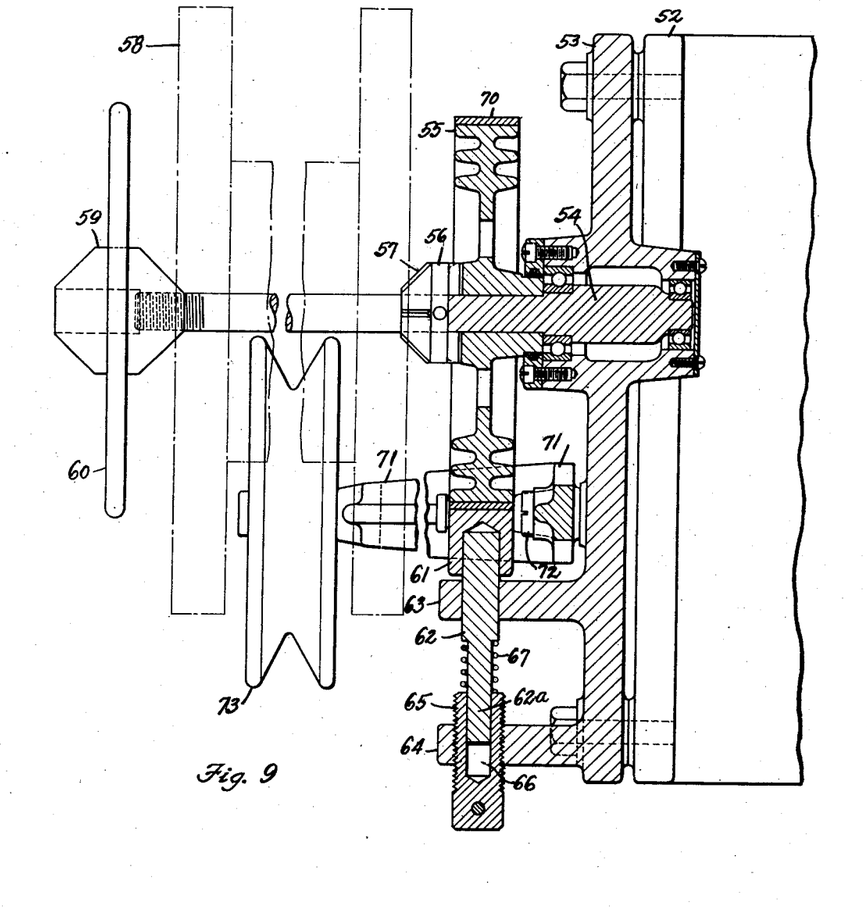
Fig. 9 is a view partly in section, the section being taken on the line 9—9 of Fig. 8.

Clutch members 98 and 96 are initially engaged by manual operation, but are automatically maintained in engagement after the machine is started and until a predetermined number of revolutions of the shaft 90 have taken place. The manually-operated mechanism for closing the clutch includes a lever 140 pivoted at 141 upon a bracket 142 attached to the gear housing 93. Lever 140 includes a stop 143 for engaging the exterior wall of housing 93, and carries a pin 144 for engaging a lever 145 pivotally mounted at 146 upon a lug 147 provided on the interior of the gear housing 93. Movement of the lever 140 toward the left causes the lever 145 to move upwardly, as viewed in Fig. 9. During this motion of the lever 145 the lever 125 is engaged thereby and is moved into such position that the spring 111 will be released, to cause the clutch members to be engaged. The operator maintains the lever 140 in position adjacent the machine for a few seconds until the driving clutch member 98 has operated the shaft 90 sufficiently to cause the Geneva gear 122 to turn and move the notch 124 out of alignment with the end of the lever 125. Then the lever 140 may be released.

The clutch member 98 is rotated continuously by an electric motor 150 which is connected with the gear 99 through a train of gears including gear 151 connected with the motor shaft and meshing with a gear 152 mounted upon the hub of a gear 153 which meshes with the gear 99. Gear 153 is provided with a bushing 154 journaled upon a stub shaft 155 carried by the gear housing 93. The shaft 90 will continue to revolve until the notch 124 and disc 123 is turned again into alignment with the lever 125. It is evident that the particular Geneva motion shown in Fig. 13, will cause the mechanism to come to rest after five revolutions of the shaft 90.

*Automatic wire release mechanism.*

Means are provided for releasing the pulleys 81 automatically when rotation of the shaft 90 is automatically stopped, so that the wires 82 may be pulled with little effort, toward the winding device without unreeling wire from the reels. Each of the pulleys 81 is mounted upon a stub shaft 160 (see Fig. 7), formed preferably integrally with clamping bracket 161 having an opening for receiving a sleeve 163. By means of a bolt 164 and a nut 165 the bracket 161 may be clamped to the sleeve 163 in various positions of vertical adjustment. A nut 166 engaging the threaded end 167 of the shaft 160 retains the pulley 81 upon the shaft 160. The sleeve 163 is slidable vertically upon a rod 168 attached at its lower end to a base block 169 which is attached to the floor upon which the pedestal 50 rests. The upper end of each rod 168 is threaded and is received by a tapped hole provided in the platform 51. By virtue of the construction described, the rods 168 are maintained parallel and serve as guides for a cylinder head member 170 having apertured bosses 171 each of which receive a rod 168. Springs 172 are interposed between the cylinder head 170 and each of the sleeves 163. The platform 51 supports a pipe coupling 173 to which is attached a stationary tubular piston rod 174 carrying at its lower end a piston 175 which is engaged by a movable cylinder 176 closed at its lower end by cap 177 and having its open upper end threaded at 178 to engage a threaded opening in the cylinder head or bracket 170. Bracket 170 is provided with an opening 179 for receiving the piston rod 174. Obviously, when fluid under pressure is confined between the piston 175 and the cylinder cap 177, the cylinder 176 will move downwardly and increase the compression of the springs 172, thereby tending to move the pulleys 81 downwardly and maintain a loop of substantial dimensions in each of the wires 82.

During the winding operation pressure fluid such as compressed air is admitted to the cylinder between the piston 175 and the cylinder cap 177. But when the winding operation stops it is desirable to release automatically the pulleys 81 in order that the wire may be manipulated, in a manner to be described, between successive winding operations. Pressure fluid is admitted to the cylinder 176 or released therefrom by valve mechanism which is controlled by a mechanism associated with the clutch release device. This valve mechanism includes a port member or valve body 180 attached by screws 181 to the interior wall of the gear housing 93. The valve body 180 includes an inlet passage 182, connected with a fluid-pressure inlet pipe 183. Passage 182 leads into a larger cylindrical passage 184 in which slides a piston valve member 185 having a cross-passage 186 connected with a longitudinal groove 187. The passage 184 is connected by pipe coupling 188 connected by a pipe 189 with the pipe coupling 173. The valve body 180 includes exhaust passage 190 which may be placed in communication with the pipe 189 when the piston valve 185 is in the position shown in Fig. 10. The lower end of the passage 184 is closed by a thimble 191 which receives a spring 192 bearing upwardly against the valve 185, which in turn is pressed against a lever 193 pivoted on rod 194 upon the gear housing 93. The other end of lever 193 presses downwardly upon the lever 145.

Figures 12, 13:
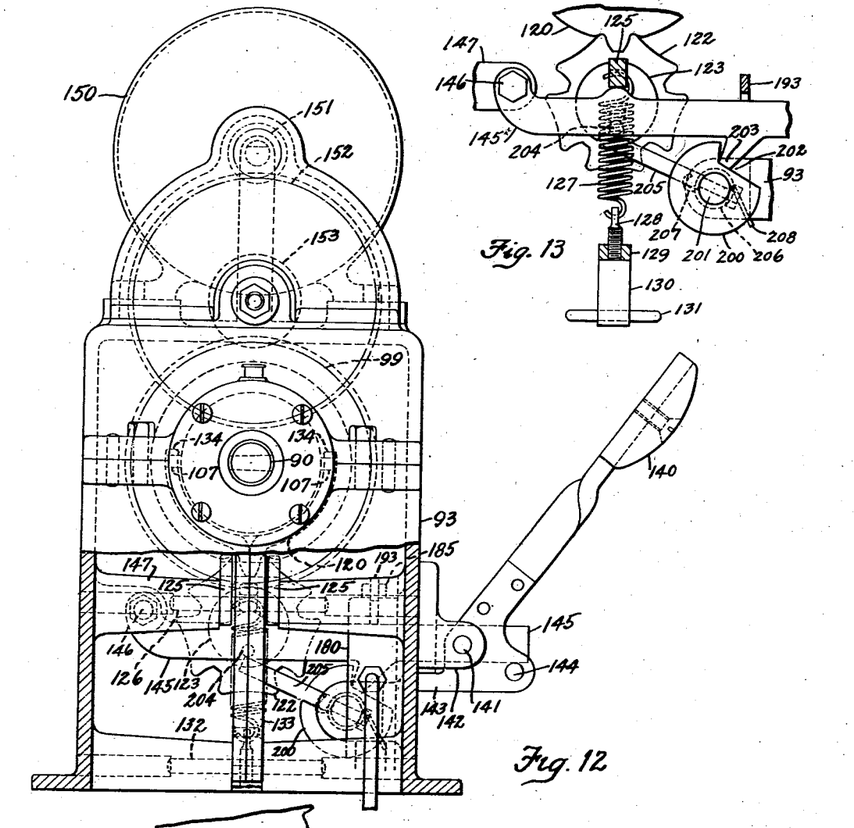
Fig. 12 is an end view partly in section on line 12—12 of Fig. 10.
Fig. 13 is a view on the line 13—13 of Fig. 10.
Figure 14:
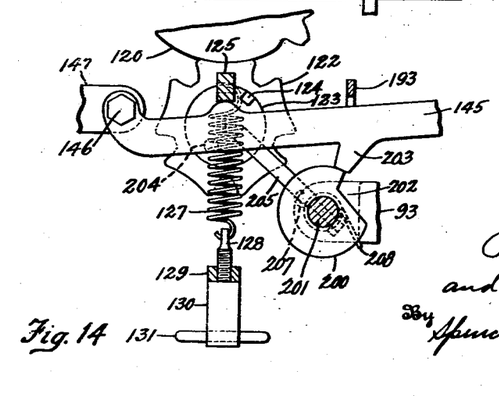
Fig. 14 is a view similar to Fig. 13, showing the apparatus in different operating position.

The movement of lever 140 toward the machine to engage the clutch causes the lever 145 to be lifted from the position shown in Fig. 13 to that shown in Fig. 14, thereby causing the lever 193 to move counter-clockwise and the valve 185 to move downwardly so that communication between the pipe 189 and the exhaust passage 190 is cut off and so that the inlet pipe 182 is connected with the pipe 189 through the cross-passage 186 and groove 187. This operation will cause the source of fluid pressure to be connected with the space in the cylinder 176 between the piston 175 and the cap 177. Therefore, the cylinder 176 will move downwardly to increase the compression of springs 172 and to maintain a substantial loop in each of the wires 82 during the winding operation.

Figures 10, 11:
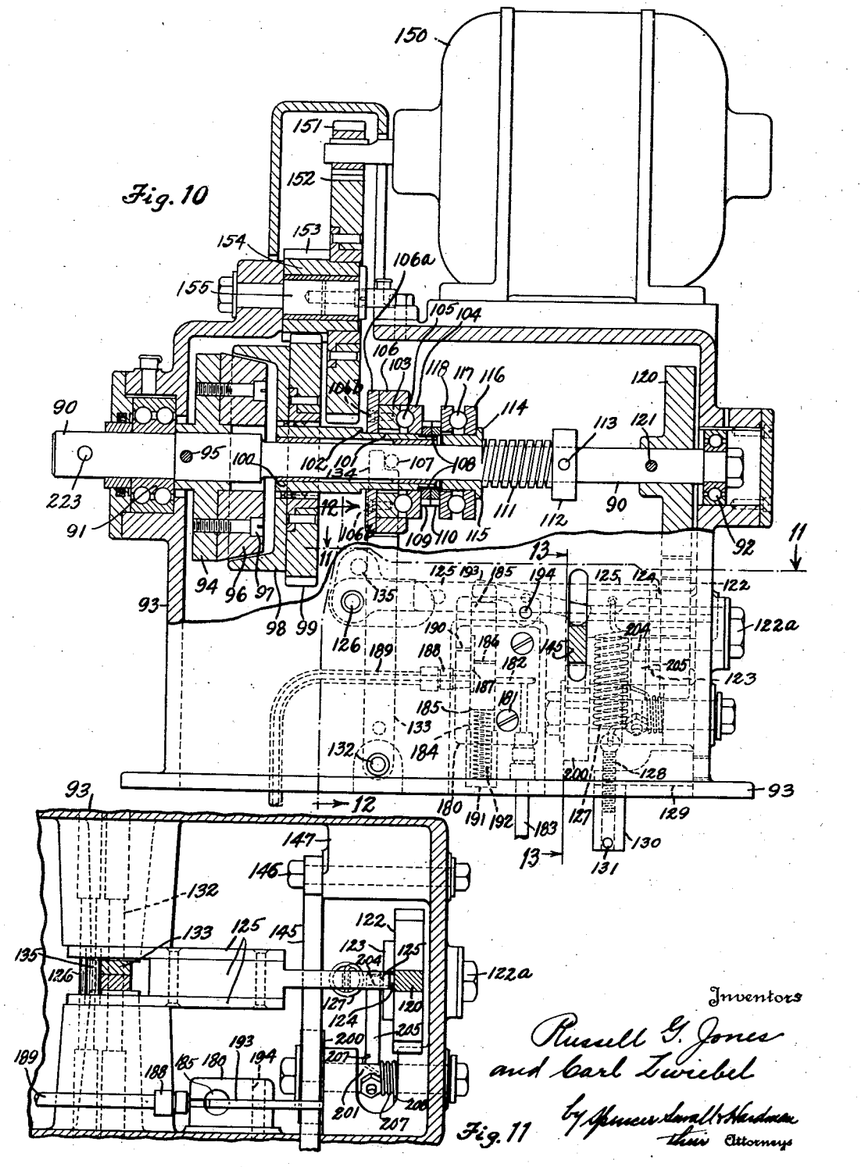
Fig. 10 is a side view partly in section of the mechanism for driving the winding fixture.
Fig. 11 is a fragmentary sectional view on line 11—11 of Fig. 10.

In order to maintain the lever 145 in position for maintaining the valve 185 in position for connecting the cylinder with a source of fluid pressure, means are provided for holding the lever 145 automatically in its upper position until motion of the shaft 90 is automatically stopped. In other words, the air valve is automatically held open during the operation of the machine, but when the machine is automatically stopped the air valve is automatically closed and the air cylinder is automatically vented to atmosphere. The mechanism for automatically maintaining the air valve open while the shaft 90 is rotating and for automatically permitting the air valve to close when the shaft stops automatically, includes a disc 200 attached to a shaft 201 which is rotatably mounted on the gearing housing 93. The disc is provided with a notch 202 for receiving a finger 203 carried by the lever 145. The disc 123 which is connected with the Geneva gear 122 carries a pin 204 which, in the stopped position of the disc 123 is vertically below the notch 124. When the machine is at rest a rod 205 attached to the shaft 201 is yieldingly urged against the pin 204 by a spring 206 having an end 207 engaging the rod 205, having an intermediate portion encircling the shaft 201 and having an end 208 pressed against the housing 93. When the machine is at rest the disc 200 is held by the engagement of the pin 204 and the rod 205, in a position so that the notch 202 may receive the finger 203 (see Fig. 13). Therefore, the lever 145 is permitted to move downwardly so that the spring 192 shown in Fig. 10 is permitted to move the valve 185 to a position for closing the air inlet duct 182. When the operator presses the lever 140 to start the machine, the lever 145 is moved upwardly so that the finger 203 is away from the path of movement of the periphery of the disc 200. Operation of the machine causes the pin 204 to move sufficiently to clear the end of the pin 205. Then the spring 206 is released to permit the disc 200 to rotate into the position shown in Fig. 14. The lever 145 is then held by the disc 200 in position for maintaining the valve 185 in open position, that is, connecting the passage 182 with the pipe 189 and blocking the exhaust pipe 190. As the disc 123 returns again to stopping position the pin 204 will engage the pin 205 and rotate it into the position shown in Fig. 13, thereby bringing the notch 202 adjacent the finger 203 so that the lever 145 will return to normal position, permitting the valve 185 to be closed again by the spring 192.

Movement of the cylinder 176 to wire-tension-relieving position shown in Fig. 5 is assisted by a weight 195 attached by cord 196 to cylinder 176, and roved over a pulley 197 pivoted at 198 upon the platform 51.

Figure 2:
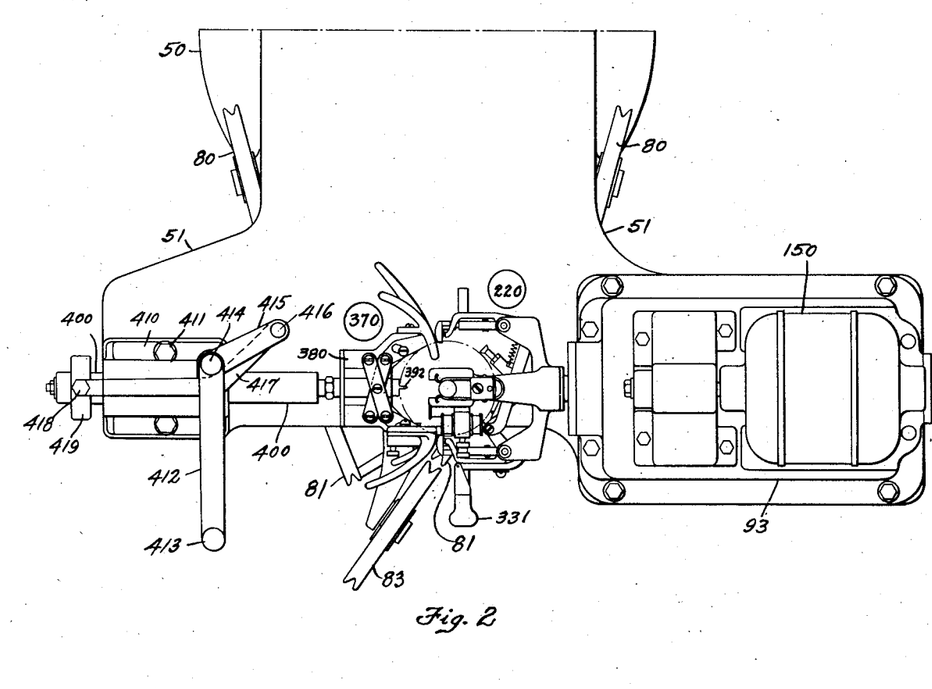

The shaft 90 supports a fixture 220 which cooperates with a fixture 370 to support an armature core 211 represented by the dot and dash line circle in Fig. 2. The fixture 370 is retractable from the fixture 220 to permit removal of the core 211. Fixture 370 includes a block 380 which is rotatably supported by a slide 400.

The slide 400 is supported for horizontal movement by bracket 410 (see Figs. 2 and 3), attached to the platform 51 by screws 411. The bracket 410 supports an operating lever 412 having a handle 413. The lever 412 is pivoted at 414 and is attached to an arm 415 connected at 416 with a link 417 pivotally connected with the other end by a screw 418 with a shifting collar 419 which it attached to the slide 400. Movement of the handle 413 to the left, as viewed in Fig. 3, will produce movement of the slide 400 in the same direction and vice versa. A detailed description of the fixtures 220 and 370 is found in the copending application referred to.

After the armature core 211 has been placed upon the fixture 220 the operator will pull the handle 331 toward him to bring the clamps 290 and 291 into wire-guiding position, shown in Fig. 2. This operation causes the armature core 211 to be located so that the neck of one of its core slots will be located in the path of movement of a locating bar 293 of the driven winding fixture 370. Then the operator will grasp the handle 413 (see Fig. 2), and move it toward him in order to move the fixture 370 toward the right as shown in Fig. 2. During this movement the locating member 392 enters into one of the slots of core 211 and movement of this member is arrested by engagement of the bar 391 with the core 211. After this occurs, further movement of the lever 413 into the position shown in Fig. 2 will cause the wire guiding jaws 371 and 372 of fixture 370 to move into the clamping position shown in Fig. 2.

Figures 3, 4:
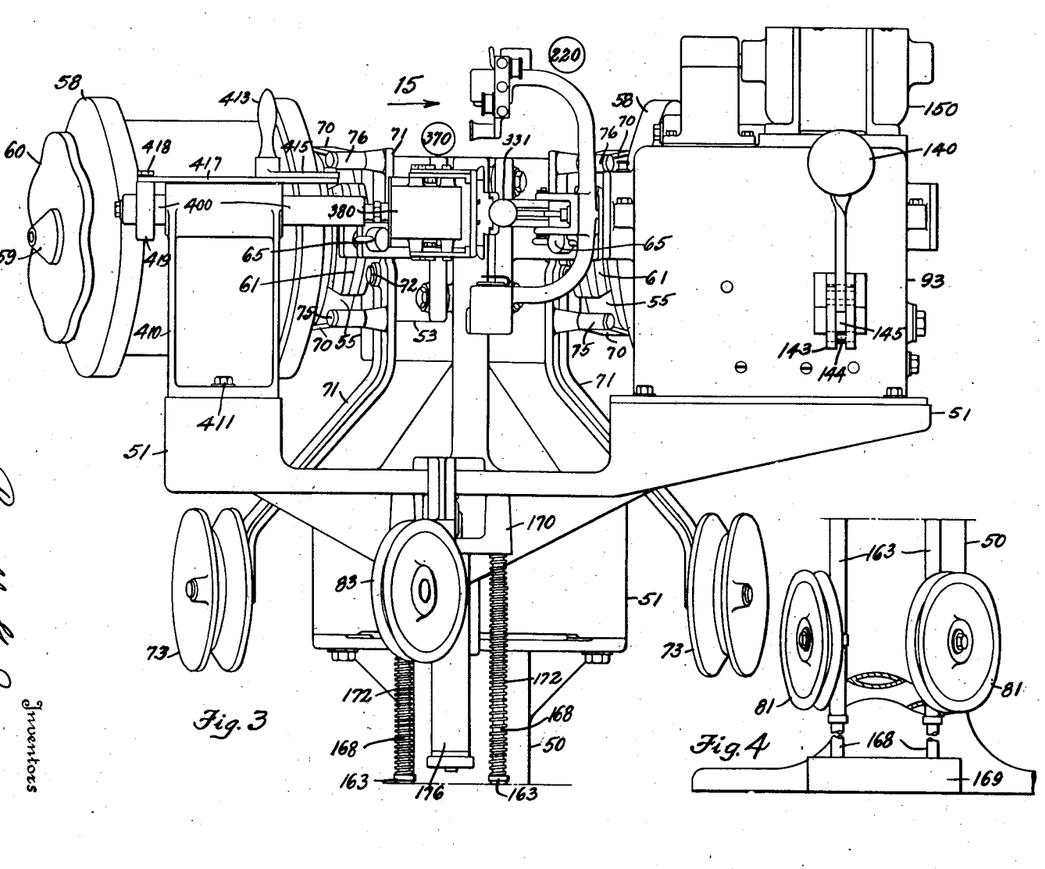
Figs. 3 and 4, taken together, comprise a front view of the machine.

The ends of the wires 82 are wrapped around the hook 272 of the fixture 220 (see Fig. 3). The operator then presses the handle 140 toward the machine to cause the motor 150 to drive the winding fixtures and armature in a counterclockwise direction as viewed from the left in Fig. 2. Rotation of the fixtures and armature will cause wire to be wound into certain spaced slots of the core and across the ends of the core, the wires 82 being guided by the horns 421 and 422 carried by the fixture 370 and by the pairs of wire-guiding clamps 291, 371, and 290, 372. The handle 140 is pressed only long enough to set the fixture into motion, after which motion is automatically maintained by the clutch-controlling mechanism previously described. After a predetermined number of revolutions of the winding fixtures 220 and 370, the rotation of the shaft 90 will automatically stop.

Before winding another coil the core 211 is located in a new position by manipulating levers 413 and 331 as explained in the copending application referred to.

One of the important features of the present invention is that of providing for automatically relieving the tension of the wires 82 as soon as the winding fixtures stop rotating. As previously explained, the mechanism which automatically produces disengagement of the clutch members also causes the air duct leading into the air cylinder 176 to be closed and the exhaust passage from the cylinder to be opened so that the weight 195 may be released to return the cylinder 176 to the position shown in Fig. 5. This will place a certain amount of slack in the wires 82 to facilitate manipulation of these wires in placing them around the loop-forming pulleys 273, 279 and 280 of the fixture 220 as shown in Fig. 3. As it is necessary to maintain a reasonable amount of tension in the wires in order to secure compact windings, it is desirable that this tension be relieved in part in order to lessen the fatigue of the operator in pulling up the wires over either of the pulleys 279 and 280.

While the form of embodiment of the invention as herein disclosed, constitutes a preferred form, it is to be understood that other forms might be adopted, all coming within the scope of the claims which follow.

What is claimed is as follows:

1. An armature winding machine comprising, in combination, a device for winding wire from a supply reel upon an armature core, means for guiding the wire from the reel to the device and including a movable member for maintaining a loop in the wire between the reel and the device during the winding operation, and means for controlling the movable member so that a substantial amount of wire may be pulled toward the winding device when desired without unreeling a substantial amount of wire from the reel.

2. An armature winding machine comprising, in combination, a device for winding wire from a supply reel upon an armature core, means for guiding the wire from the reel to the device and including a movable member for providing a loop in the wire between the reel and the device, means for maintaining the movable member in position to provide a loop of substantial dimensions in the wire, and a control for rendering said loop maintaining means inoperative so that a substantial amount of wire may be pulled toward the winding device without substantially unreeling the wire.

3. An armature winding machine comprising, in combination, a device for winding wire from a supply reel upon an armature core, means for guiding the wire from the reel to the device and including a movable member for providing a loop in the wire between the reel and the device, means for maintaining the movable member in position to provide a loop of substantial dimensions in the wire, and a control for stopping operation of the winding device and for rendering said loop maintaining means inoperative so that a substantial amount of wire may be pulled toward the winding device without substantially unreeling the wire.

4. An armature winding machine comprising, in combination, a device for winding wire from a supply reel upon an armature core, means for guiding the wire from the reel to the device and including a movable member for providing a loop in the wire between the reel and the device, means for maintaining the movable member in position to provide a loop of substantial dimensions in the wire, and a control for automatically stopping the operation of the winding device in response to a predetermined number of operations of the device and for rendering said loop maintaining means inoperative so that a substantial amount of wire may be pulled toward the winding device without substantially unreeling the wire.

5. An armature winding machine comprising, in combination, a device for winding wire from a supply reel upon an armature core, means for guiding the wire from the reel to the device and including a movable member for providing a loop in the wire between the reel and the device, means for maintaining the movable member in position to provide a loop of substantial dimensions in the wire, and a control for starting the operation of the winding device and for rendering the loop maintaining means operative during the winding operation, for stopping operation of the winding device and for rendering said loop maintaining means inoperative so that a substantial amount of wire may be pulled toward the winding device without substantially unreeling the wire.

6. An armature winding machine comprising, in combination, a device for winding wire from a supply reel upon an armature core, means for guiding the wire from the reel to the device and including a movable member for providing a loop in the wire between the reel and the device, means for maintaining the movable member in position to provide a loop of substantial dimensions in the wire, and a control for starting the operation of winding device and for rendering the loop maintaining means operative during the winding operation, for automatically stopping the operation of the winding device in response to a predetermined number of operations of the device and for rendering said loop maintaining means inoperative so that a substantial amount of wire may be pulled toward the winding device without substantially unreeling the wire.

7. An armature winding machine comprising, in combination, a device for winding wire from a supply reel upon an armature core, means for guiding the wire from the reel to the winding device and including an edgewise movable pulley, means tending to maintain the pulley in a position for providing a loop in the wire of substantial dimensions between the reel and the winding device, and a control for applying or releasing said pulley maintaining means.

8. An armature winding machine comprising, in combination, a device for winding wire from a supply reel upon an armature core, means for guiding the wire from the reel to the winding device and including an edgewise movable pulley, a fluid pressure means tending to maintain the pulley in a position for providing a loop in the wire of substantial dimensions between the reel and the winding device, and a valve for controlling the admission of pressure fluid to said pulley maintaining means.

9. An armature winding machine comprising, in combination, a device for winding wire from a supply reel upon an armature core, means for guiding the wire from the reel to the winding device and including an edgewise movable pulley, a fluid pressure means tending to maintain the pulley in a position for providing a loop in the wire of substantial dimensions between the reel and the winding device, and a valve and control therefor operating automatically in response to the stopping of the machine for discontinuing the application of pressure fluid to said pulley maintaining means.

10. An armature winding machine comprising, in combination, a device for winding wire from a supply reel upon an armature core, means for guiding the wire from the reel to the winding device and including an edgewise movable pulley, a fluid pressure means tending to maintain the pulley in a position for providing a loop in the wire of substantial dimensions between the reel and the winding device, a valve for controlling the admission of pressure fluid to said pulley maintaining means, and means for stopping the operation of the winding device and for closing the valve automatically at the end of a predetermined number of operations of the winding device.

11. An armature winding machine comprising, in combination, a device for winding wire from a supply reel upon an armature core, means for guiding the wire from the reel to the winding device and including an edgewise movable pulley, a fluid pressure means tending to maintain the pulley in a position for providing a loop in the wire of substantial dimensions between the reel and the winding device, a valve for controlling the admission of pressure fluid to said pulley maintaining means, and controlling means for starting operation of the winding device and for maintaining the valve open during the winding operation and for stopping the operation of the winding device and for closing the valve automatically at the end of a predetermined number of operations of the winding device.

12. An armature winding machine comprising, in combination, a device for winding wire from a supply reel upon an armature core, and means operative when the winding device is inoperative for permitting the wire to become slack between the reel and the winding device so that a substantial amount of wire may be pulled toward the winding device without substantially unreeling any of the wire.

13. An armature winding machine comprising, in combination, a reel supporting spindle, a winding device for winding upon an armature core wire from a reel supported upon the spindle, means for guiding wire from the reel to the device and including two pulleys which are movable edgewise in response to acceleration in linear winding speed, spring means yieldingly resisting the movement of one of the pulleys so as to reduce the suddenness of jerking of the other pulley during said accelerations, and means for applying a variable braking friction to the spindle in response to movement of said other pulley.

14. An armature winding machine comprising, in combination, a reel supporting spindle, a winding device for winding upon an armature core wire from a reel supported upon the spindle, means for guiding wire from the reel to the device including two pulleys which are movable edgewise in response to acceleration in linear winding speed, means for applying spring pressure to resist movement of one of the pulleys so as to reduce the suddenness of jerking of the other pulley during said acceleration, means for applying a variable braking friction to the spindle in response to movement of said other pulley, and means for releasing the spring pressure applying means so that a length of wire may be drawn toward the winding device without requiring a substantial movement of said brake controlling pulley.

In testimony whereof I hereto affix my signature.

RUSSELL G. JONES.

In testimony whereof I hereto affix my signature.

CARL ZWIEBEL.